UNITED STATES PATENT OFFICE.

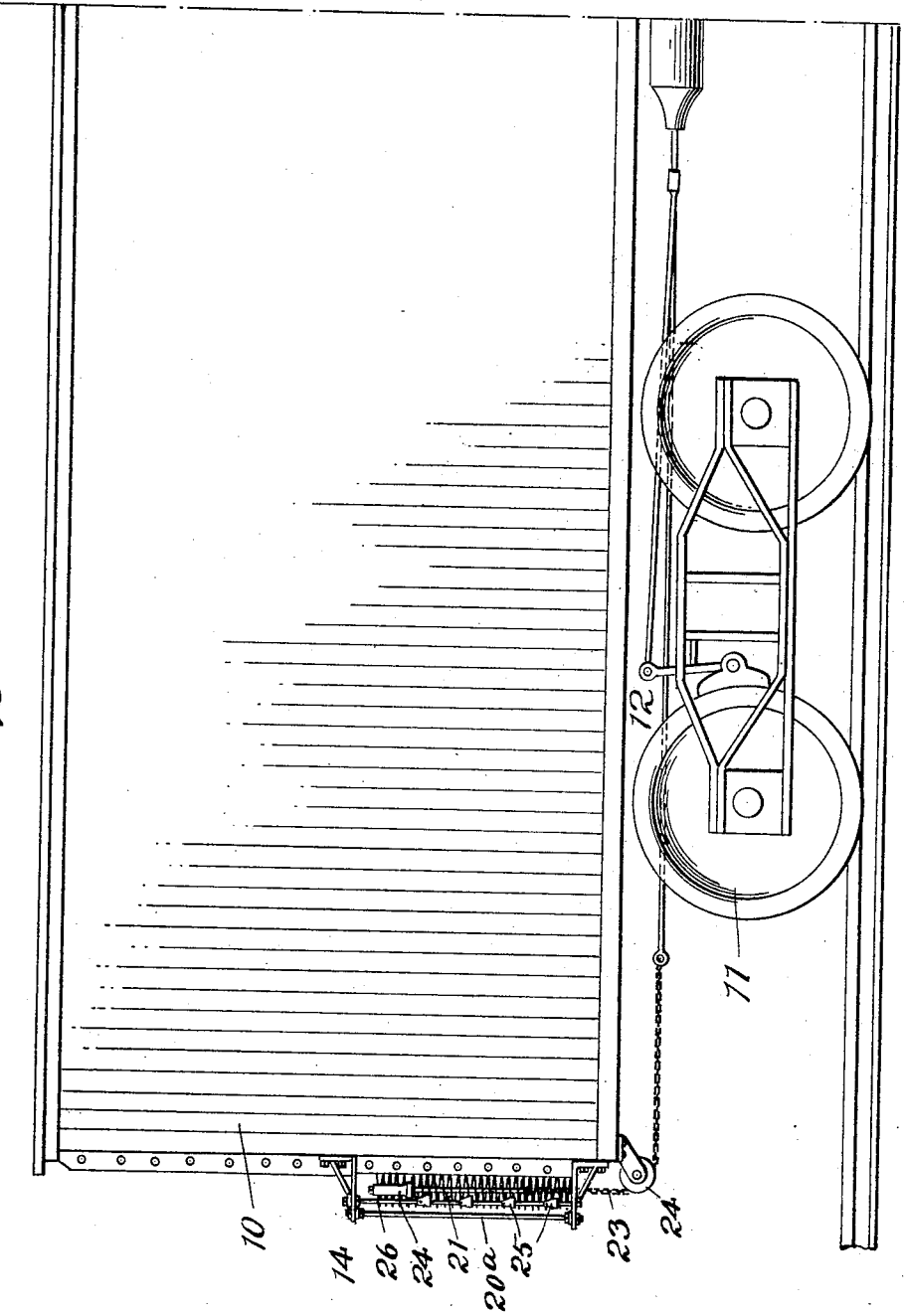

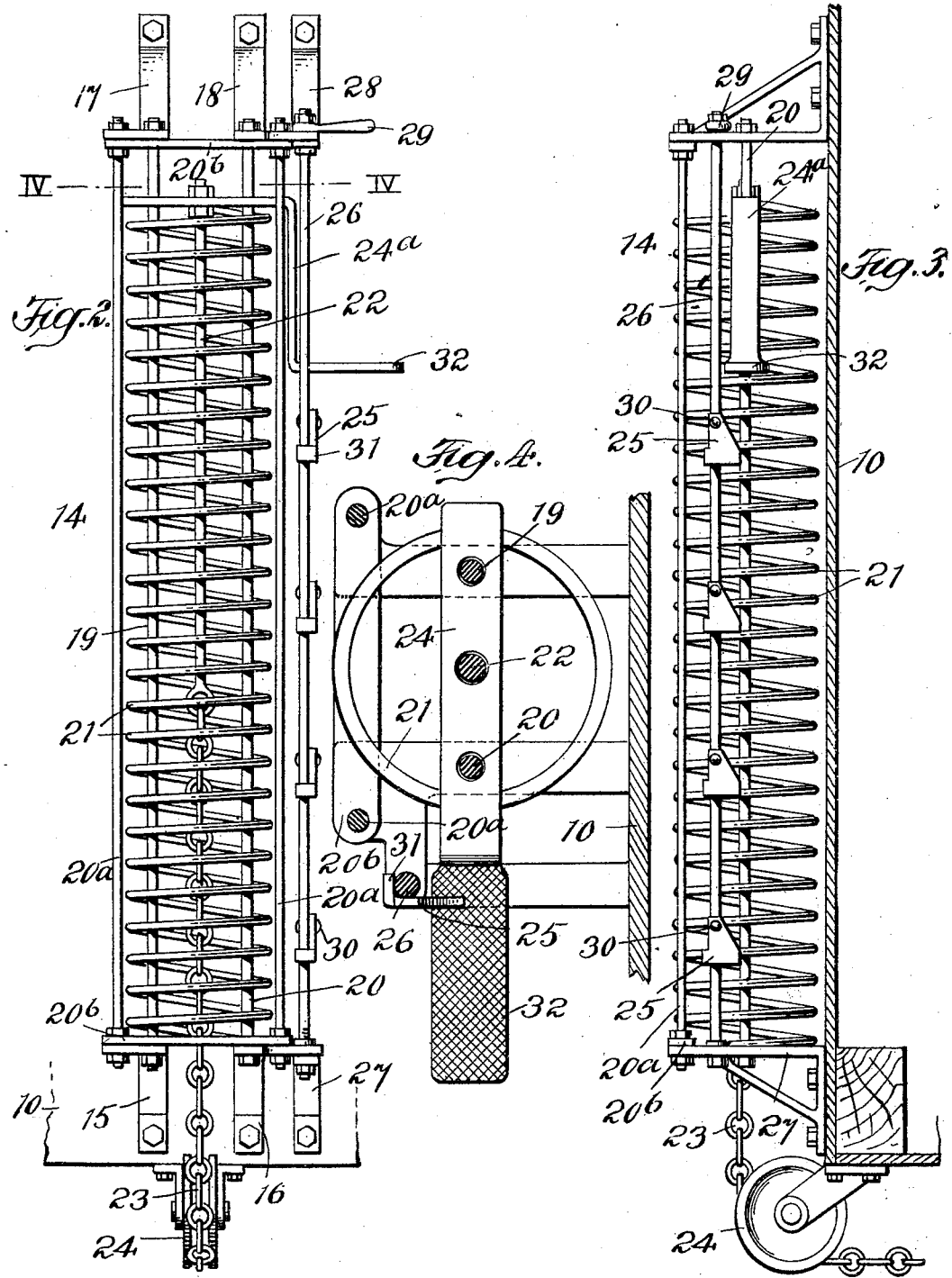

CORNELIUS M. McCARTHY, OF JERSEY CITY, NEW JERSEY.

CAR-BRAKE MECHANISM.

932,994. Specification of Letters Patent. Patented Aug. 31, 1909.

Application filed May 15, 1908. Serial No. 433,040.

*To all whom it may concern:*

Be it known that I, CORNELIUS M. MC-CARTHY, a citizen of the United States, and a resident of Jersey City, county of Hudson, and State of New Jersey, have invented certain new and useful Improvements in Car-Brake Mechanisms, of which the following is a full, clear, and exact description.

This invention relates more particularly to emergency brake mechanism for railway cars.

The primary object of the invention is to provide simple and efficient means whereby the brakes of freight and other cars may be quickly applied in case it is desired to do so, thereby overcoming many objections incident to the use of the ordinary brake as applied by the hand wheel or like methods which often result in the cars being injured while making up trains, and in other cases by reason of the fact that the brakes can not be applied quickly enough.

A further object of the invention is to provide simple means which may be readily applied to cars as ordinarily constructed with substantially no change whatever, and which may be connected to the brake mechanism as used in connection with railway cars.

With these and other objects in view, the invention will be hereinafter more particularly described with reference to the accompanying drawings, which form a part of this specification, and will then be pointed out in the claims at the end of the description.

In the drawings, Figure 1 is an elevation of a freight car with one form of mechanism embodying my invention applied thereto, Fig. 2 is a fragmentary view of a car body showing a front view of the invention as applied thereto. Fig. 3 is a vertical section showing a side view of the invention; and Fig. 4 is a sectional plan view taken on the line IV—IV of Fig. 2.

The car body 10 may be supported upon the car truck 11, and arranged on the car body may be any form of brake mechanism as 12, which is adapted to stop the car, and which may be operated in the usual or in any preferred way, all of which may be of the usual or of any preferred construction.

As an independent means, or in addition to the usual brake mechanism, I arrange upon a part of the car body at the front thereof a device 14. This device is supported by means of the brackets 15 and 16 near the lower part of the car, and by upper brackets 17 and 18, and extending between the brackets 15 and 17 is a guide rod 19, and between the brackets 16 and 18 is a guide rod 20. The device 14 may be further braced by the rods 20$^a$, and these rods may be connected by the transverse bars 20$^b$ to rigidly hold the parts together. A spring 21 is arranged between the brackets and around the guide rods 19 and 20, and said spring is of sufficient tension and of such length that when compressed and then released as will be presently described, it will serve to apply the brakes with sufficient force to stop the car. The spring member may comprise one or more elements and may have a tension of about sixty pounds, and arranged within the spring or spring member is a short rod or bar 22 to the lower end of which may be arranged a chain or other connection 23 which is adapted to pass around a pulley or sheave 24, and connected to the brake mechanism in any suitable way. The spring 21 is shown when the brakes are applied, the normal position for application of the brakes being when the spring is compressed.

To compress the spring and to hold the same in position to apply the brakes when released, I arrange a foot-piece or device 24$^a$ which is attached to the rod 22 and is guided on the rods 19 and 20, so that as the foot-piece 24$^a$ is forced downward the spring will be also forced downward and will be compressed between the foot-piece 24$^a$ or other device and the brackets 15 and 16, and in the compressed position will be held by means of pawls 25 which are held to the rod 26. The rod 26 is rotatably held in the brackets or arms 27 and 28 projecting outward from the car body, and on one end of said rod is a handle 29 by which the said rod may be rotated. A plurality of pawls 25 are provided, and each pawl is pivoted at 30 to the rod 26, and has a heel 31 adapted to engage the rod 26 to determine its inward movement, and when the foot-piece or device 24 is forced downward it will pass by one or more of the pawls which will move on the pivots 30, and as soon as the foot-part 32 passes by the pawls the latter will be restored to their normal position and will prevent upward movement of the foot-piece except by releasing the pawls. The force of the spring may be varied by the extent of compression and in case it is desired to apply the brakes, all that is necessary is to rotate the rod 26 by means of a handle 29 which will move the pawls 25 out of the path of movement of the foot-piece 24 or compressing device which will permit the spring to recoil and in doing so to force the rod 22 upward and through the connection 23 apply the brake mechanism.

From the foregoing it will be seen that simple and efficient means is provided whereby the brakes of freight or other railway cars or vehicles may be quickly applied in case of emergency or for other purposes with sufficient force to stop the car and thereby prevent injury thereto; that a simple device is provided which may be readily attached to cars without altering the same in any way; and that the device is so constructed that it may be easily placed in position so that when released the brakes may be applied.

Having thus described my invention, I claim as new and desire to secure by Letters Patent:—

1. The combination with brake mechanism, of a vertically movable rod, means connecting the rod to the brake mechanism, a spring tending to force the rod to apply the brakes and means provided with a plurality of independently pivoted pawls for holding the spring compressed to the desired extent.

2. The combination with brake mechanism, of a movable member, means connecting the movable member to the brake mechanism, a spring tending to force the movable member connected to the brake mechanism to apply the brakes, a device for compressing the spring, rotary rod provided with movable pawls for holding the device against the action of the spring or to permit the latter to be released when said rod is rotated.

3. The combination with brake mechanism, of a vertically movable rod, means connecting the rod to the brake mechanism, a spring tending to force the rod to apply the brakes, a device for compressing the spring, and means provided with a plurality of independently pivoted pawls for holding said device against movement.

4. The combination with means for attachment to brake mechanism, of brackets, guide rods held to the brackets, a vertically movable rod, means for connecting the vertically movable rod to the brake mechanism, a spring member arranged around the guide rods and movable with the movable rod, a device for forcing the rod and spring so as to compress the same, a rotary rod arranged adjacent to the spring, a handle for rotating the rod, and pawls pivotally held to the rod and adapted to engage the device when the spring is compressed and to release said device when the rod is rotated whereby the spring may act to apply the brakes.

5. The combination with means for attachment to brake mechanism, of brackets, a movable rod, means for connecting the rod to the brake mechanism, a spring movable with the movable rod, a device for forcing the rod and spring so as to compress the same, a rotary rod arranged adjacent to the spring, means for rotating the rod, and a series of pawls pivotally held to the rod and adapted to engage the device when the spring is compressed and to release said device when the rod is rotated in one direction whereby the spring may act to apply the brakes.

6. The combination with brake mechanism, of a device attached thereto, of a rotary rod arranged adjacent said device, and pawls pivotally held to said rod and adapted to engage said device and to release the same when the rod is rotated whereby the brakes may be quickly applied.

7. The combination with means for attachment to brake mechanism, of a vertically movable rod, means for connecting the vertically movable rod to the brake mechanism, a spring movable with the movable rod, a device for forcing the rod and spring so as to compress the same, a rotary rod arranged adjacent to the spring, a handle for rotating the rod, and pawls pivotally held to the rod and adapted to engage the device when the spring is compressed and to release said device when the rod is rotated whereby the spring may act to apply the brakes.

8. The combination with means for attachment to brake mechanism, of guide rods, a movable rod, means for connecting the movable rod to the brake mechanism, a spring arranged around the guide rods and movable with the movable rod, a foot device for forcing the rod and spring so as to compress the same, a rod arranged adjacent to the spring, and pawls pivotally held to the rod and adapted to engage the device when the spring is compressed and to release said device when the rod is moved whereby the spring may act to apply the brakes.

9. The combination with means for attachment to brake mechanism, of brackets, a vertically movable rod, means for connecting the vertically movable rod to the brake mechanism, a spring movable with the movable rod, a foot device for forcing the rod and spring so as to compress the same, a rotary rod arranged adjacent to the spring, a handle for rotating the rod, and pawls pivotally held to the rod and adapted to engage the device when the spring is compressed and to release said device when the rod is rotated whereby the spring may act to apply the brakes.

This specification signed and witnessed this 11th day of May, A. D. 1908.

CORNELIUS M. McCARTHY.

Witnesses:
W. A. TOWNER, Jr.,
E. M. DASO.